Figure 1:
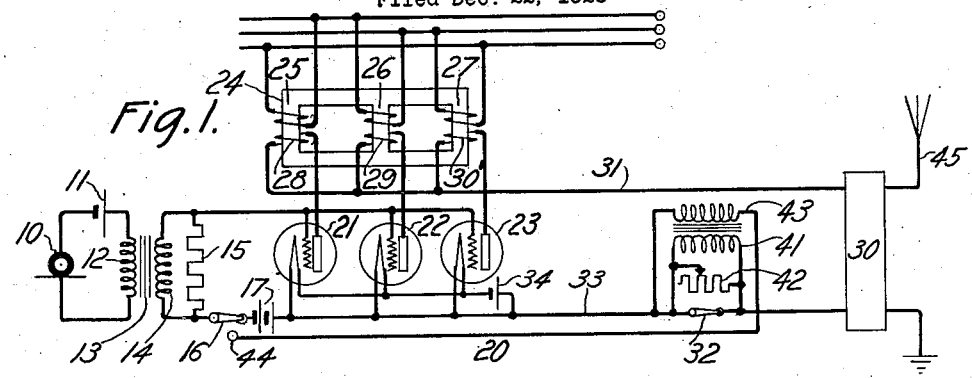

July 5, 1927. 1,634,800
J. C. SCHELLENG
RECTIFYING AND MODULATING SYSTEM
Filed Dec. 22, 1923 2 Sheets-Sheet 1

Inventor:
John C. Schelleng
by ―――― Att'y.

July 5, 1927.

J. C. SCHELLENG 1,634,800

RECTIFYING AND MODULATING SYSTEM

Filed Dec. 22, 1923      2 Sheets-Sheet 2

Inventor:
John C. Schelleng
by E.W. Adams Att'y.

Patented July 5, 1927.

1,634,800

UNITED STATES PATENT OFFICE.

JOHN C. SCHELLENG, OF EAST ORANGE, NEW JERSEY, ASSIGNOR TO WESTERN ELECTRIC COMPANY, INCORPORATED, OF NEW YORK, N. Y., A CORPORATION OF NEW YORK.

RECTIFYING AND MODULATING SYSTEM.

Application filed December 22, 1923. Serial No. 682,182.

This invention relates to rectifying and modulating systems.

An object of the invention is to rectify alternating currents as sources of energy in electric signaling systems.

Another object of the invention is to simultaneously rectify polyphase alternating currents, to vary in accordance with speech the restified currents, and to eliminate harmonics in the rectified currents.

A further object of the invention is to utilize three-phase current as the source of energy in a rectifying and modulating system and to suppress ripples in the current from the rectifying system.

A still further object of this invention is to transmit signal modulated energy derived from a source of polyphase current and to substantially prevent undesired harmonic variations in the modulated energy.

A feature of this invention relates to a transformer having its windings arranged to impress ripple potentials on the rectifier to compensate for and to suppress ripple components in the rectified current.

Another feature relates to means common to the input and output circuits of a polyphase rectifier for impressing potentials upon the grids of the rectifier tubes whereby the impedance of the space paths of the tubes is caused to vary in such manner as to substantially eliminate ripples in the rectified current.

A further feature of the invention is an auxiliary arrangement of vacuum tubes associated with a vacuum tube rectifier to suppress harmonics in the rectified current.

Another feature of the invention relates to an improved connection of vacuum tube rectifiers to transformers supplied with energy from a source of three-phase current.

The invention may be embodied, for example, in a radio transmitting system comprising a source of signals, a vacuum tube rectifier and oscillator and means for suppressing ripples. Signals from the source may be caused to control energy from the rectifier which is connected to a polyphase source of current. Variations in the rectified current produce amplitude variations of the oscillatory currents of the oscillator corresponding to signals. The oscillator is coupled to an antenna for radiating signal modulated energy. Various means are provided to suppress ripples in the rectified current. These may include a transformer having its windings connected to the input and output circuits of the rectifier. The transformer impresses ripple potentials on the input circuit to suppress ripple currents in the output circuit. The function of this transformer may be performed by a resistance and condenser serving a similar purpose or by a system of auxiliary rectifier tubes.

Various embodiments of the invention as illustrated in the drawings are the following:

Fig. 1, a radio transmitting system utilizing three-phase current and having a vacuum tube rectifier-modulator with a transformer arranged to suppress ripples.

Figure 2:
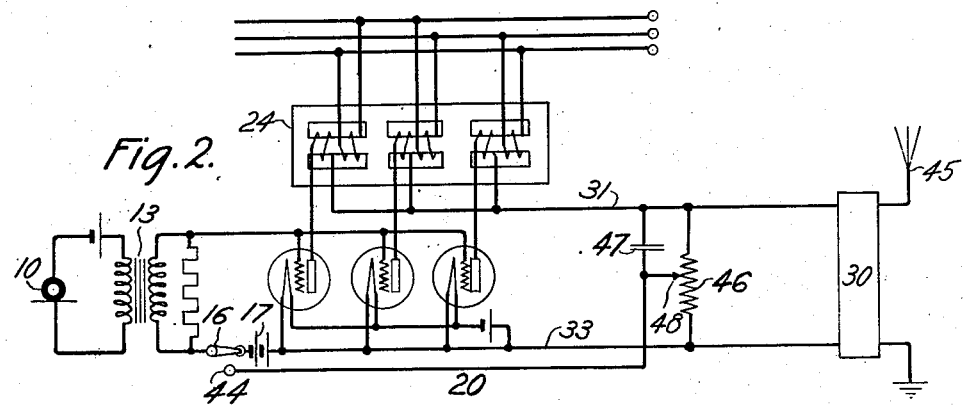

Fig. 2, a system similar to Fig. 1 which utilizes a resistance and condenser to prevent ripples.

Figure 3:
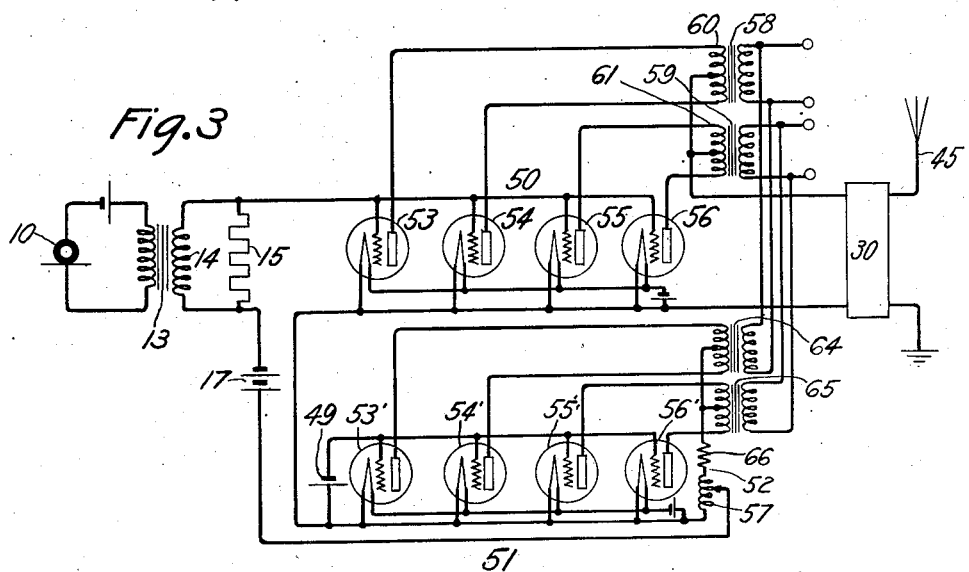

Fig. 3, a radio transmitting system provided with a rectifier-modulator having an auxiliary rectifier to suppress ripples in the current flowing through the rectifier-modulator.

Figure 4:
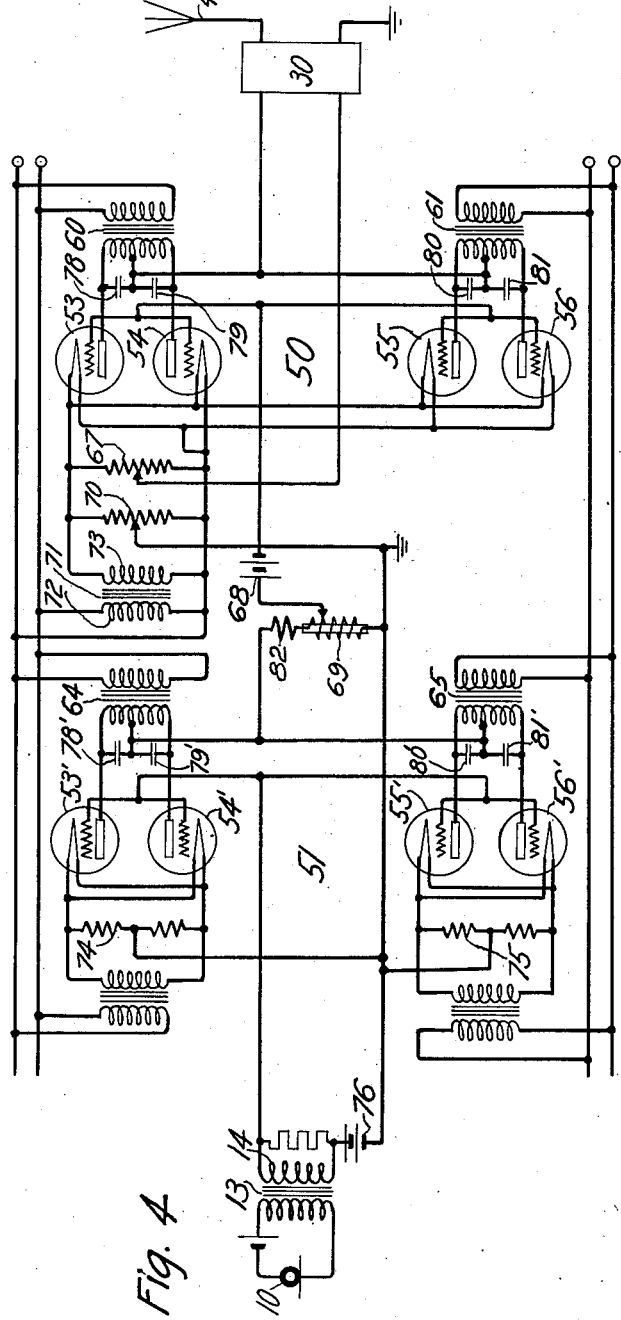

Fig. 4, a radio transmitting system having an oscillator and a rectifier connected in tandem and provided with an auxiliary amplifying rectifier to suppress ripples in the current supplied to the oscillator.

Figure 5:
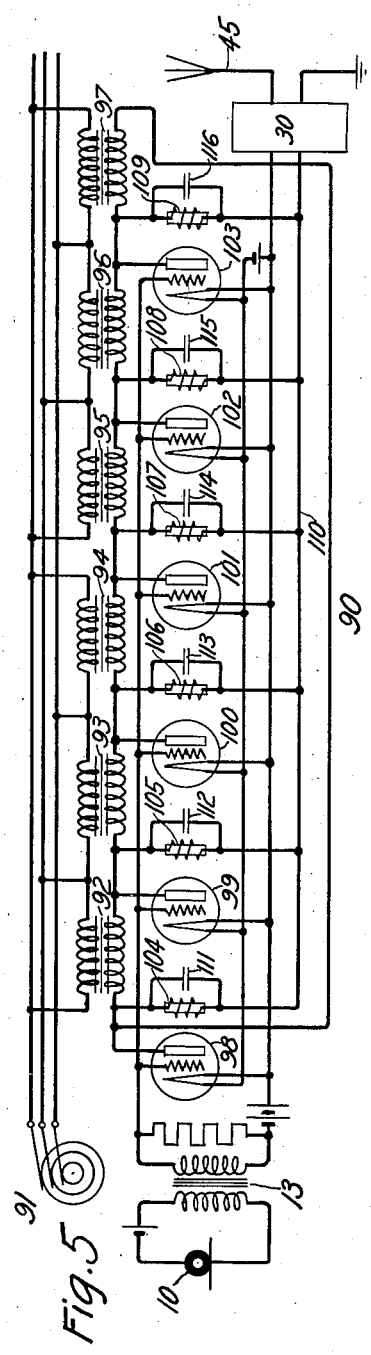

Fig. 5, a radio transmitting system employing a rectifier-modulator supplied with energy from a source of three-phase current.

Like reference characters have been used throughout the various figures of the drawings to indicate similar parts.

In Fig. 1, a microphone transmitter 10 is arranged to control the flow of current through a rectifier-modulator 20 connected to an oscillator represented by block 30 and provided with a transformer 41—43 arranged to suppress ripples in the current from the rectifier. Microphone 10 is connected in series with battery 11 and the primary winding 12 of transformer 13. The secondary winding 14 of this transformer which is shunted by resistance 15 arranged to stabilize the impedance of the circuit is connected across the grids and filaments of tubes 21, 22 and 23 of rectifier 20. A switch 16 is shown connected in series with winding 14 and the grid polarizing battery 17.

A core type transformer 24 comprises primary windings 25, 26 and 27 connected to separate phases of a three-phase source of alternating current. One terminal of each of the secondary windings 28, 29 and 30' is connected to the plates of tubes 21, 22 and 23, respectively. The opposite terminals of the secondary windings are connected to a common output circuit. This output circuit may be traced as follows: from the plates of tubes 21, 22 and 23 to windings 28, 29 and 30' of transformer 24, conductor 31, oscillator 30, switch 32, conductor 33 to the filaments of tubes 21, 22, and 23 in parallel. A battery 34 is arranged to heat the filaments of these tubes. Transformer 41—43 has a primary winding 41 connected to the terminals of switch 32 and has a resistance 42 connected in shunt therewith. The secondary winding 43 of this transformer has one terminal connected to conductor 33 and its opposite terminal connected to a contact 44 of switch 16. By moving switch 16 to contact 44 and by opening switch 32 the transformer 41—43 has its primary winding connected in series in the rectifier output circuit and its secondary winding connected in series with the rectifier input circuit. Oscillator 30 is connected to supply energy to an antenna 45.

The system illustrated in Fig. 2 is identical with the system shown in Fig. 1 with the omission of transformer 41—43 and switch 32 and the substitution therefor of resistance 46 and condenser 47. Resistance 46 is arranged in parallel to the output circuit of rectifier 20 by having its terminals connected to leads 31 and 33. Condenser 47 shunts a portion of resistance 46. One terminal of condenser 47 connects to conductor 31 and the opposite terminal connects to variable contact 48 of resistance 46 and to contact 44 of switch 16. When switch 16 is thrown to contact 44, the portion of resistance 46 not shunted by condenser 47 is included in the input circuit of rectifier 20. Condenser 47 is designed to have low impedance to currents of the ripple frequency. Variable resistance 46 enables the proper average negative potential to be impressed upon the grids of the tubes.

The operation of the system of Fig. 1 is as follows: Signal variations of currents are produced in the primary 12 by transmitter 10 under the action of sound waves. Corresponding variations are thus produced in the secondary 14 and impress varying potentials upon the grids of tubes 21, 22 and 23 corresponding to the signals. Currents from a source of polyphase energy are transmitted through transformer 24 to the rectifier 20 and appear in the output circuit of the rectifier as continuous current. In general this rectified current contains variations having frequencies which are harmonic to that of the polyphase source. Variations of the potential of the grids of tubes 21, 22 and 23 produced by signal source 10 cause variations of the impedance of these tubes whereby signal variations in the rectified current are produced. These variations are impressed upon the oscillator 30 from which signal modulated energy is transmitted to antenna 45 and radiated therefrom.

The energy radiated from antenna 45 will be modulated in accordance with undesired harmonic variations unless switch 16 is thrown to contact 44 and switch 32 is opened. When this is done currents containing harmonic variations or ripples flow through the primary winding 41 and induce alternating electromotive forces of the same frequency in the secondary winding 43 now connected between the filaments and grids of tubes 21, 22 and 23. The transformer windings are so connected that positive increase in the amplitude of ripple components produces a corresponding increase in the negative potentials of tubes 21, 22 and 23 whereby the impedance of these tubes is proportionally increased with the result that the ripple components are substantially eliminated from the rectified current. Resistance 42 is variable to allow adjustment of the ripple potentials impressed upon the grids.

The circuit of Fig. 2 operates in a manner very similar to that of Fig. 1. Condenser 47 offers low impedance to ripple components of the rectified current and consequently the full potential of these components is applied to the portion of resistance 46 included between variable contact 48 and conductor 33. The drop in potential along this portion of the resistance therefore varies in accordance with ripple variations and serves to impress negative potentials upon the grids of the tubes of rectifier 20, which vary the impedance of these tubes in such manner as to substantially eliminate the ripple component.

The system of Fig. 3 comprises a transmitter 10, a two-phase rectifier-modulator 50, an oscillator 30, an auxiliary rectifier 51, and an artificial load circuit 52. The rectifier-modulator 50 comprises three-electrode vacuum tubes 53, 54, 55 and 56. The grids and filaments of these tubes are connected to a common input circuit comprising secondary 14 of transformer 13 shunted by resistance 15, grid polarizing battery 17 and variable inductance 57. Transformers 58 and 59 have their primary windings arranged to be connected to the two phases of a two-phase source of alternating current. The secondary windings 60 and 61 of these transformers have their terminals connected respectively to the plates of tubes 53 and 54, 55 and 56. A common output circuit for the rectifier 50 is connected to the mid-points of windings 60 and 61 and to the filaments of the tubes of rectifier 50. This output circuit includes the oscillator 30.

Transformers 64 and 65, which supply polyphase current to auxiliary rectifier 51, have their primaries connected to the opposite phases of the two-phase source of alternating current and have the terminals of their secondary windings connected to the plates of tubes 53', 54', 55' and 56' respectively. An artificial load circuit comprising inductance 52 and resistance 66 in series, is connected between the mid-points of the secondaries of transformers 64 and 65 and filaments of the tubes of auxiliary rectifier 51.

Oscillator 30 transmits energy to antenna 45.

The microphone 10 of Fig. 3 causes signal variations of potential on the grids of tubes 53, 54, 55 and 56. The varying potentials impressed on the grids of these tubes cause similar variations in the rectified current flowing in the output circuit connected thereto and supplied to the oscillator 30. Thus, signal modulated energy is transmitted from the oscillator 30 to the antenna 45 and radiated therefrom into space.

Ripple variations occur in the rectified current as already explained and one means of suppressing these ripples comprises an auxiliary rectifier 51. Current from this rectifier containing ripples of the same frequency as ripples from the output circuit of rectifier 50 flows through an artificial load circuit comprising resistance 66 and inductance 52 connected in circuit between the plates and filaments of the tubes of this rectifier. Ripple voltages are thus produced across inductance 57 a portion of which is included in the circuit connected between the filaments and grids of tubes 53, 54, 55 and 56. The ripple voltages in the inductance are thus impressed upon the grids of rectifier 50 in such manner as to vary the impedance of the tubes whereby ripple variations in the rectified current therefrom are substantially eliminated. Battery 49 is connected between the filaments and grids of the tubes of rectifier 51 to establish a proper average potential thereon.

The circuit of Fig. 4 constitutes a radio telephone system comprising a transmitter 10 arranged to control the output of a rectifier-modulator 50 supplying energy to an oscillator 30 which is coupled to an antenna 45. An auxiliary rectifier 51 is coupled to rectifier-modulator 50 to suppress ripples in the rectified current supplied to oscillator 30. This system is, in some respects, similar to the one described in Fig. 3. Transformers 60 and 61 supply two-phase electrical current to the rectifier tubes 53 and 54, 55 and 56, respectively. The common output circuit of the tubes of rectifier 50 supplies energy to oscillator 30 connected to antenna 45. This output circuit connects to the plates of tubes 53, 54, 55 and 56 at intermediate points of the secondary windings of transformers 60 and 61. The separate sections of these windings are shunted by condensers 78, 79, 80 and 81, respectively, to supply paths for signal frequencies. The common output circuit connects to the filaments of the tubes of rectifier-modulator 50 at a mid-point on resistance 67 connected in shunt to the filaments of tubes 53, 54, 55, and 56, which filaments are mutually in parallel. The grids of the tubes of rectifier 50 are connected to a common input circuit comprising grid polarizing battery 68, a portion of choke coil 69, and a resistance 70 which is connected in shunt to resistance 67, to supply a separate path to the filaments of the tubes of rectifier 50. Transformer 71 has its primary 72 connected to one phase of the source of two-phase alternating current. The secondary 73 of this transformer is connected to the filaments of tubes 53, 54, 55 and 56 in parallel for supplying heating current thereto.

The plates of tubes 53', 54', 55' and 56' of rectifier 51 are connected to the two-phase source of alternating current in the same manner as the plates of the tubes of rectifier 50.

Signal variations are produced by transmitter 10 in a circuit which may be traced as follows: secondary winding 14 of transformer 13, grids of tubes 53', 54', 55' and 56', the filaments of these tubes, divided resistances 74 and 75, grid polarizing battery 76, and winding 14. Variations in this current produce signal variations in the output circuit of the tubes of rectifier 51 which may be traced as follows: plates of the tubes, secondary windings of transformers 64 and 65 shunted by condensers 78' and 79', 80' and 81' respectively, resistance 82, choke coil 69, and divided resistances 74 and 75 in parallel to the filaments of the tubes. Signal currents are thus produced in this circuit. Rectified current also flows in this circuit, which current has ripple components of the same frequency as ripple components in the output circuit of rectifier 50. Thus, signal voltages and ripple voltages induced across choke coil 69 impress varying potentials upon the grids of tubes 53, 54, 55 and 56. Signal variations of this voltage produce corresponding variations of the rectified current supplied to oscillator 30 whereby signal modulated energy is supplied to antenna 45. The ripple voltages applied to the grids of the tubes of rectifier 50 serve to vary the impedance of these tubes so as to substantially eliminate the ripple component of the rectified current.

Condensers 78', 79', 80' and 81' furnish a low impedance path for currents of signal frequency about the windings 64 and 65.

Fig. 5 illustrates a radio transmission system comprising a vacuum tube rectifier-modulator 90 supplied with current from a three-phase generator 91 and controlled by a source of signals 10. An oscillator 30 receives energy from the rectifier and transmits signal modulated energy to the antenna 45. Energy is supplied to the rectifier 90 from the generator 91 by means of transformers 92, 93, 94, 95, 96 and 97. The secondary windings of these transformers are delta connected. The plates of tubes 98, 99, 100, 101, 102 and 103 are connected to points intermediate the successive secondaries. Choke coils 104, 105, 106, 107, 108 and 109 also have one of their respective terminals connected to points intermediate to the successive secondaries. Their opposite terminals connect to a common lead or neutral 110. In order to provide paths for signal frequency currents, these choke coils are shunted by individual condensers 111, 112, 113, 114, 115 and 116. An oscillator 30 is connected between the neutral 110 and the filaments of the rectifier tubes.

Signal currents flowing in the primary of transformer 13 produce corresponding electromotive forces in the secondary winding and these are impressed across the grids and filaments of the rectifier tubes. The impedance of the space paths of these tubes is varied in accordance with the variations of potential impressed upon the grid. Corresponding variations are thus produced in the rectified current supplied to oscillator 30. The high frequency oscillations generated therein are modulated in a manner now well understood and this modulated energy is transmitted to antenna 45 from which it is radiated.

The various embodiments of this invention which have been herein shown and described are not to be construed as limiting the scope thereof since numerous other embodiments will occur to persons skilled in the art. The scope of the invention is, therefore, to be determined as set forth in the appended claims.

The invention claimed is:

1. In a radiant energy transmission system, a source of signals, a space discharge modulator and an oscillator arranged to supply energy to an antenna, said oscillator and said modulator being controlled by said source of signals and being supplied with energy from a three-phase source of current, and said modulator and oscillator having means connected thereto for impressing ripple potentials upon the grids of said modulator to suppress ripple variations in the current flowing between said modulator and oscillator.

2. In a modulating system, a source of signals, a rectifier comprising a plurality of three-electrode space discharge tubes having a common control circuit coupled to said source of signals, means for producing oscillations, said means being supplied with energy from said rectifier, a source of polyphase alternating current connected to the plates of said rectifier tubes, an auxiliary rectifier supplied with energy from said source of polyphase alternating current, an artificial load circuit for said auxiliary rectifier, a portion of said load circuit being connected in series in the control circuit of said first named rectifier whereby ripples in the rectified current therefrom are substantially eliminated.

3. In a radio signaling system, a source of signals, a rectifier controlled by said source for supplying rectified current to an oscillator, an antenna connected to said oscillator, a second rectifier, and means common to the output circuit of said second rectifier and to the input circuit of said first named rectifier, said means functioning to suppress ripples in the current from said first named rectifier.

4. In a modulating system, a plurality of rectifiers having input and output circuits connected in tandem, a source of signals connected to a control circuit of one of said rectifiers, an oscillator supplied with energy from another of said rectifiers, and means included wholly in an output circuit of one of said rectifiers and partly in an input circuit of said other rectifier for suppressing ripples in the rectified current from one of said rectifiers.

5. The method of reducing ripples in the output current of a plural phase rectifying system comprising rectifiers which comprises increasing and decreasing the impedance of the rectifiers in proportion to and in phase with the amplitude of any existing ripple component but preventing increased steady rectified component from changing the impedance of said rectifier.

In witness whereof, I hereunto subscribe my name this 14th day of December, A. D. 1923.

JOHN C. SCHELLENG.